United States Patent [19]
Moyer

[11] Patent Number: 5,975,052
[45] Date of Patent: Nov. 2, 1999

[54] FUEL EFFICIENT VALVE CONTROL

[76] Inventor: David F. Moyer, 5 Weatherby Rd., Hanover, N.H. 03755-1923

[21] Appl. No.: 09/088,444

[22] Filed: Jun. 1, 1998

Related U.S. Application Data

[63] Continuation-in-part of application No. 09/013,211, Jan. 26, 1998.

[51] Int. Cl.$^6$ ................................ F02P 9/00; F02D 17/02
[52] U.S. Cl. ............................... 123/406.23; 123/406.32; 123/198 F; 123/90.15
[58] Field of Search ................. 123/406.23, 406.32, 123/198 F, 481, 90.12, 90.14, 90.15, 90.16, 316

[56] References Cited

U.S. PATENT DOCUMENTS

| | | | |
|---|---|---|---|
| 5,398,544 | 3/1995 | Lipinski et al. | 123/198 F |
| 5,404,844 | 4/1995 | Schechter | 123/90.12 |
| 5,408,966 | 4/1995 | Lipinski et al. | 123/198 F |
| 5,408,974 | 4/1995 | Lipinski et al. | 123/481 |
| 5,529,549 | 6/1996 | Moyer | 123/198 F |
| 5,623,906 | 4/1997 | Storhor | 123/406.23 |
| 5,636,609 | 6/1997 | Fujiyoshi | 123/198 F |
| 5,695,430 | 12/1997 | Moyer | 123/527 |
| 5,826,563 | 10/1988 | Patel et al. | 123/481 |
| 5,832,885 | 11/1988 | Moyer | 123/90.16 |

*Primary Examiner*—Willis R. Wolfe
*Assistant Examiner*—Hieu T. Vo

[57] ABSTRACT

A method for improving efficiency and reducing emissions of an internal combustion engine. Variable displacement engine capabilities are achieved by disabling engine valves during load changes and constant load operations. Active cylinders may be operated at minimum BSFC by intermittently disabling other cylinders to provide the desired net torque. Disabling is begun by early closing of the intake valve to provide a vacuum at BDC which will result in no net gas flow across the piston rings, and minimum loss of compression energy in the disabled cylinder; this saving in engine friction losses is significant with multiple disablements.

7 Claims, 2 Drawing Sheets

FUEL EFFICIENT VALVE CONTROL

CROSS REFERENCE

This application is a continuation in part which discloses and claims subject matter disclosed in my earlier pending application Ser. No. 09/013,211 filed Jan. 26, 1998. This continuation describes improvements to the Gas Motor operation in the previous application which may be applied to non-hybrid internal combustion engines as well.

FIELD OF THE INVENTION

The present invention relates to the field of internal combustion engines; more particularly to a method of controlling the engine intake and exhaust valves so as to produce an efficient combustion process within the cylinder.

BACKGROUND OF THE INVENTION

This invention describes a method for increasing the efficiency and reducing the undesirable emissions of an internal combustion engine. While the general principles and teachings hereinafter disclosed are applicable to all combustion engines, the invention is hereinafter described in detail in connection with its application to a reciprocating, fuel injected, spark ignited, multi-cylinder engine.

As used herein, the term "engine" refers to a device which converts heat energy, released by the combustion of a fuel, into mechanical energy in a rotating output shaft of the engine. Also, the term "disabled cylinder" is defined as having the intake and exhaust valves of a cylinder disabled so that they remain closed while the crankshaft is rotating. These valves may be poppet valves driven by a camshaft common to such engines or any other valves which admit or discharge a gaseous mixture to or from the cylinder. Also, the term "brake specific fuel consumption" (BSFC) is defined as the amount of fuel consumed to produce a given power at the engine drive shaft.

In the United States, the law requires that many types of vehicles must be tested over a specified driving cycle (CVS test) while the fuel consumed and the exhaust emissions generated are measured. This driving cycle has many periods of acceleration, deceleration and idle, with few periods of steady speed, and is intended to reflect typical urban vehicle usage. During deceleration and idle operation it is difficult to control emissions in typical internal combustion engines—particularly throttled engines—because of the low manifold pressures at these times. Also, when the accelerator pedal is released, fuel continues to be consumed even though no energy is required from the engine. The emissions measured during this test must be less than those specified by law at the time of manufacture, and the fuel consumed is used in the determination of the vehicle manufacturer's corporate average fuel economy (CAFE).

DESCRIPTION OF THE PRIOR ART

The poppet valve driven by a camshaft has been used in the internal combustion engine for many years. Modifications to the camshaft have been developed to permit changing the valve timing while the engine is in operation. When the timing control prevents the valves from opening during an engine cycle, the cylinder is disabled, and the effect of a variable displacement engine is obtained. The advantage of a variable displacement engine is that when less than maximum efficiency power is required, some of the cylinders may be disabled and the remaining active cylinders' power is increased so that they will operate at greater efficiency, while the engine output remains constant. This approach has had limited success in practice because of the abrupt change in output torque when a cylinder is disabled or enabled.

One of the more advanced methods of controlling the disablement and enablement of the cylinders is shown in Lipinski et al U.S. Pat. No. 5,408,966. The object of their invention is "to provide a system for operating an engine's intake and exhaust valves so as to accomplish transitions between maximum operation with all cylinders activated and fractional operation with only some of the cylinders activated, without causing excessive exhaust emissions, and with maximum gains in engine efficiency". They describe a discrete cylinder control valve which serves to disable all of the poppet valves associated with any one cylinder at the same time. Further, they arrange the valves' timing such that each deactivated cylinder will be filled with exhaust gas from its final power stroke. The present invention has the same objective but it controls the intake and exhaust valves separately. Upon cylinder deactivation, the exhaust valve is disabled after it closes following the exhaust stroke, and the intake valve is closed early in the intake stroke and then disabled so that a vacuum is obtained at bottom dead center (BDC). This results in higher combustion efficiency in the remaining active cylinders, as will be explained subsequently.

Schechter's U.S. Pat. No. 5,404,844 describes an engine with a variable lift camless valvetrain wherein the engine valves are hydraulically operated. He uses valve control to eliminate the throttle body by closing the intake valve before BDC. Recognizing the undesirable temperature drop during the charge expansion after the valve closes, he proposes circulation of the charge into the exhaust manifold at the beginning of the intake stroke in order to pick up exhaust heat, which will result in a higher temperature after expansion. As an alternative, he suggests a separate heat exchanger for heating the intake charge. In the present invention, neither of these provisions is necessary. The elimination of the throttle is accomplished by intermittently disabling cylinders so that each active cylinder has a higher charge and associated temperature with a lower BSFC than if all cylinders were active. When the time between active cylinder firings exceeds a drivability limit, an active cylinder's charge is reduced by early intake valve closing, but it is operating with a charge equal to the sum of all the cylinders' charge in a non-disabled engine and its temperature is much higher.

Fujiyoshi's U.S. Pat. No. 5,636,609 is concerned with the poor combustion because of the temperature drop in a disabled cylinder when it has been inactive for some time. He avoids this by different schedules of disablement for keeping the various cylinder temperatures relatively similar. His engine has a throttle, does not control the valve opening time or duration, nor manage the drivability, as does the present invention. The present invention calls for the computer calculated alternation of inactive cylinders with the active ones, which in turn results in the average cylinder temperature being the same as that of the conventional engine at the same speed and load.

SUMMARY OF THE INVENTION

The main object of this invention is to improve the fuel efficiency and reduce the undesirable emissions of the internal combustion engine while powering a vehicle in normal operating conditions. This object is accomplished by varying the timing of the engine intake and exhaust valves. These valves are opened and closed as rapidly as possible and the timing of when they open and close is controlled by a computer which calculates the optimum timing. The computer adjusts the valve timing based upon operator demands and stored engine data to produce maximum fuel efficiency with adequate emission control, uniform engine temperature, and smooth engine operation. This valve control also eliminates the need for the throttle and exhaust gas recirculation valve and their attendant contribution to engine losses.

The object is further accomplished by discontinuing the fuel flow whenever the accelerator pedal is released and the engine is above idle speed.

METHOD OF OPERATION OF THE INVENTION

In the following description, the method and apparatus used to accomplish the objects of the invention are embodied in an engine control system applied to a reciprocating, multicylinder, fuel injected, spark ignited internal combustion engine. It should be understood, however, that the principles and approaches taken in connection with this particular type of engine are applicable to other types as well.

The engine valves and fuel injectors are electrically controlled. The control computer receives signals from the accelerator position sensor, the crankshaft position sensor, and other engine and ambient sensors. It calculates engine control values based on these inputs and the engine data in its memory, and sends control signals to the valves and fuel injectors as well as other components such as the spark generator.

The accelerator sensor indicates the amount of power required from the engine. The computer calculates the time between power strokes for a cylinder operating at minimum BSFC to achieve this power at any given speed. If this time is less than the maximum allowed for drivability, it then schedules the valve actions, fuel pulses, and spark timing for a schedule of active cylinders which will average out to the proper power while maintaining uniform temperature in the cylinders. The valve timing strategy includes the necessary exhaust gas retention (EGR) for emission control and the proper valve overlap for minimum BSFC.

If the time between power strokes exceeds the maximum for drivability, then it calculates the change in valve timing which results in the minimum increase in BSFC with shorter time between power strokes to achieve the drivability. This may result in the same increase in BSFC for each power stroke, or may result in different increases intermittently.

The minimum BSFC usually occurs in a conventional engine with wide open throttle and a stochiometric fuel ratio (that mixture of fuel and air whereby there is just enough air to supply the oxygen to burn all the fuel). However, when one of the cylinders is disabled, the engine minimum BSFC is improved because the disabled cylinder no longer absorbs power on the compression stroke since it is compressing and expanding the trapped air like a pneumatic spring. The active cylinders lose the compressed air energy in blowdown during the exhaust stroke.

When a cylinder is deactivated, it is best done by closing the intake valve early in the intake stroke so as to have a cylinder vacuum at bottom dead center (BDC). The point of closure is dependent upon the cylinder dimensions, but the result of the vacuum is to have a pressure differential (cylinder pressure minus crankcase air pressure) across the piston rings which, integrated over the piston stroke, will net out to zero gas flow. This means no crankcase oil will be sucked into the cylinder, and also, the compression work of disablement will not be lost. If the disablement occurs when the cylinder is full of atmospheric air after intake, or worse, full of exhaust under greater pressure, the pressure differential will result in leakage past the rings until the vacuum described above is attained. On each compression stroke, some of the air and hence some of the disablement compression energy will be lost. When the disablement is rotated among the cylinders to achieve uniform temperature and smooth operation, that disablement energy can be significant since the active cylinders are operating with a full charge.

Whenever the accelerator pedal is released, the computer disables all cylinders to reduce compression losses and stops fuel flow until the engine speed reaches the idle value. At that time, the computer activates the appropriate number of cylinders to generate the required idle power.

REFERENCE NUMBERS LIST

Figure 2:
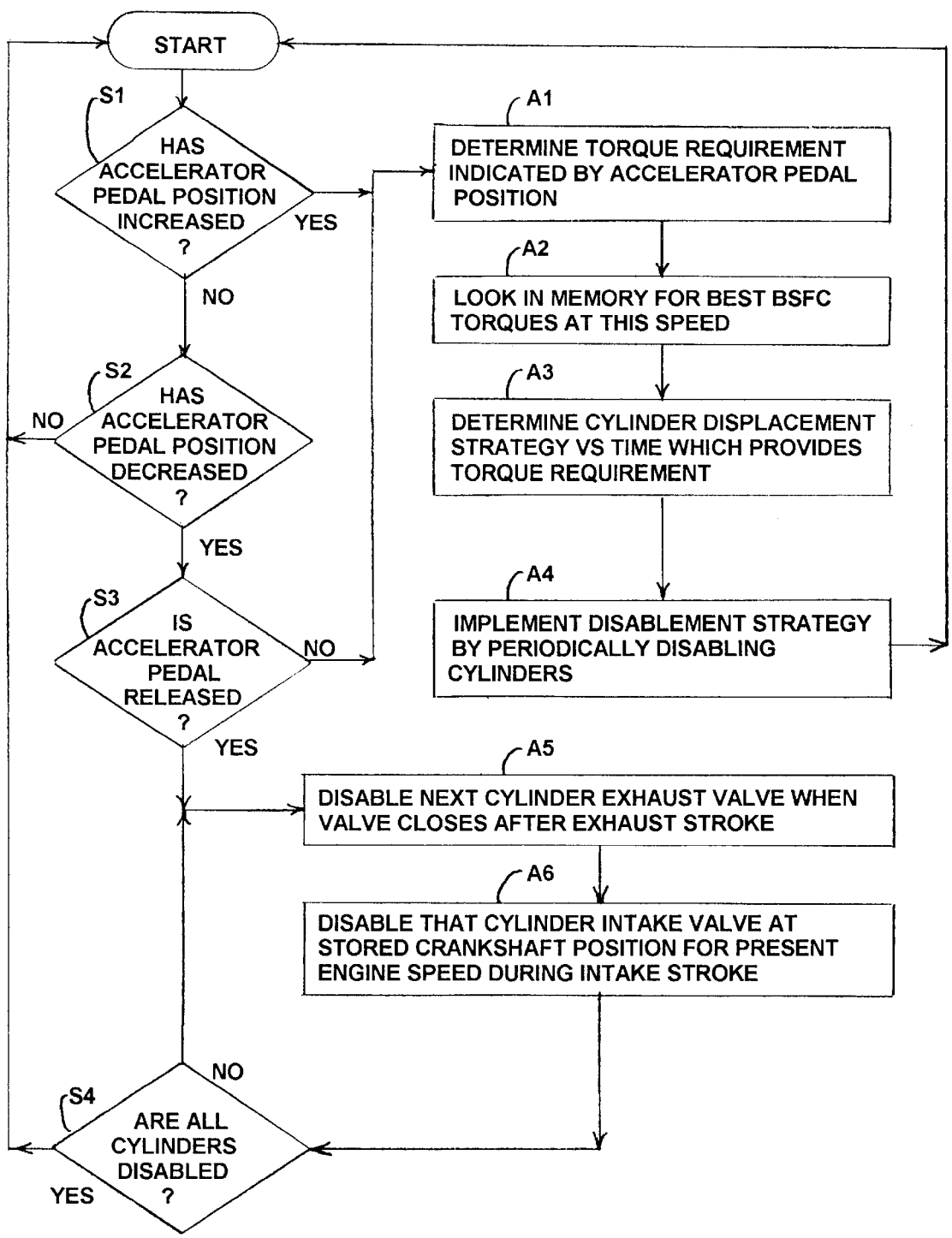
Figure 1:
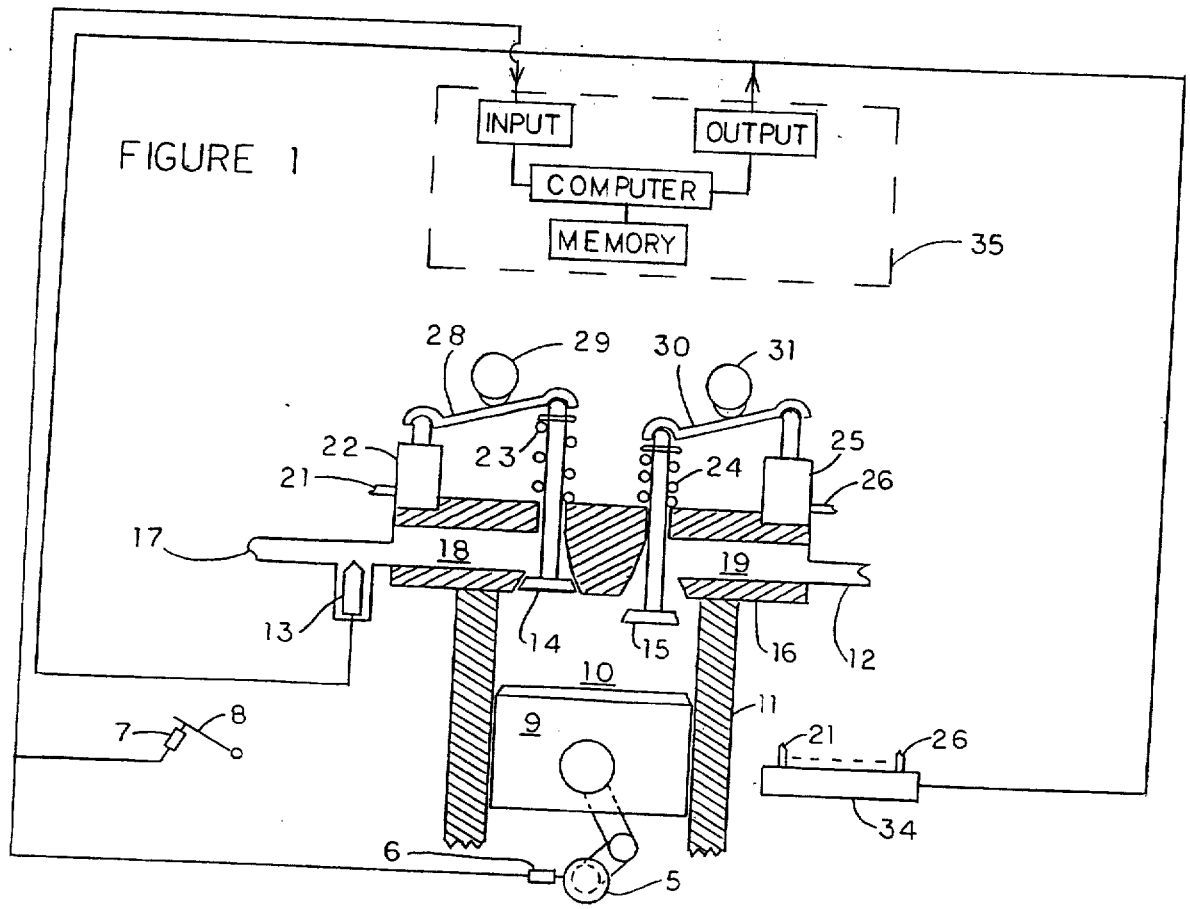

7. Accelerator pedal position sensor
8. Accelerator pedal
9. Piston
10. Cylinder
11. Engine block
12. Exhaust line
13. Fuel injector
14. Intake valve
15. Exhaust valve
16. Engine head
17. Intake line
18. Intake manifold
19. Exhaust manifold
21. Intake fulcrum line
22. Intake valve fulcrum
23. Intake valve spring
24. Exhaust valve spring
25. Exhaust valve fulcrum
26. Exhaust fulcrum line
28. Intake rocker arm
29. Camshaft intake cam
30. Exhaust rocker arm
31. Camshaft exhaust cam
34. Fulcrum regulator
35. Controller FIG. 2 is a flow diagram of the control steps in the engine operation.

DETAILED DESCRIPTION OF THE INVENTION

Figure 1:
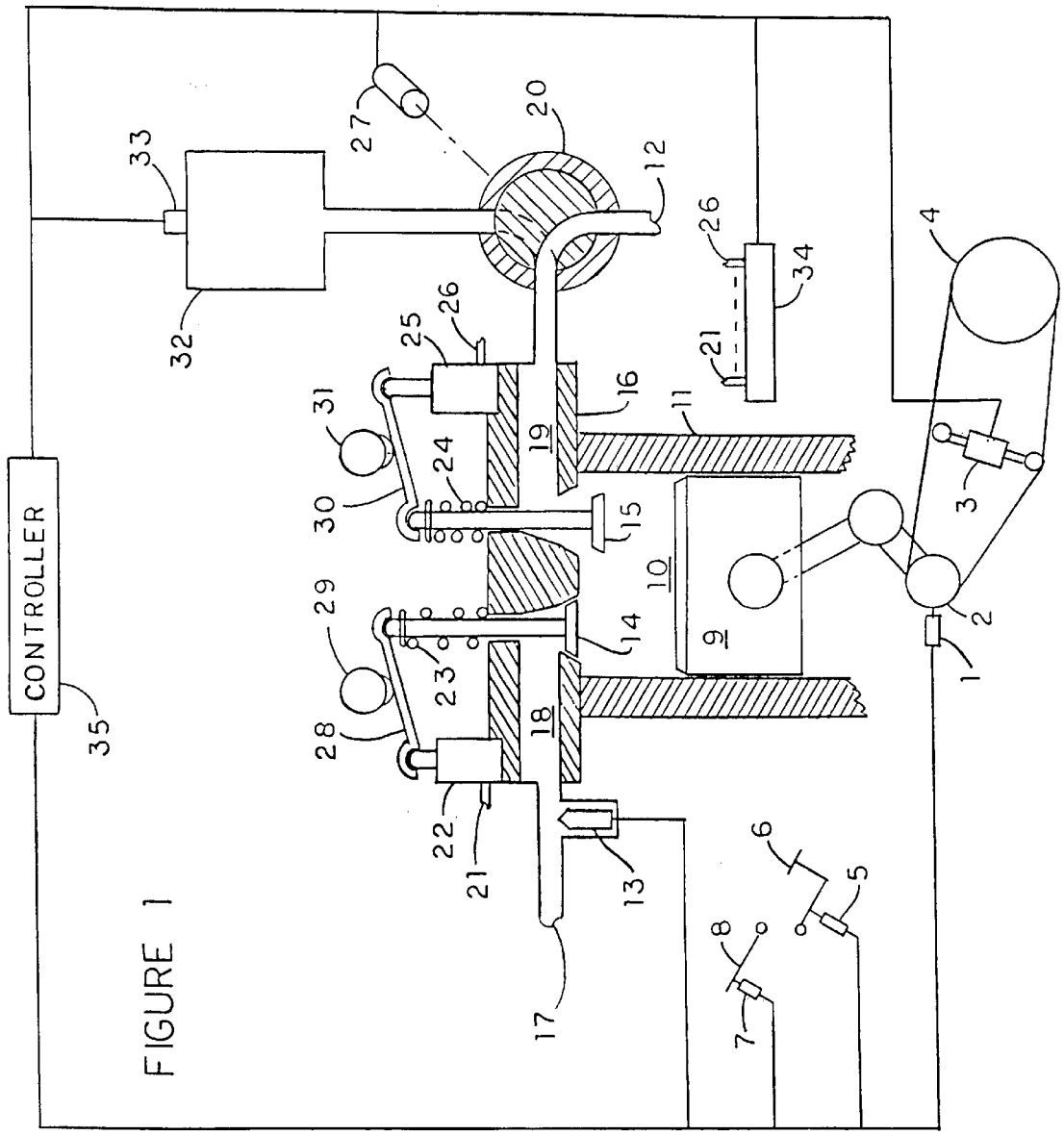
FIG. 1 is a schematic block diagram of the engine control system of a reciprocating, fuel injected, spark ignited, multicylinder combustion engine. A section of one of the cylinders is shown in conjunctions with other elements of the system. The reference numbers list identifies each part shown.

FIG. 1 shows a cross section of one cylinder 10 of a vehicle engine with engine block 11, which has a plurality of cylinders. A piston 9 is mounted for reciprocal motion within cylinder 10. A spark plug (not shown) ignites the fuel-air mixture in the usual fashion. Piston 9 is mechanically connected to a crankshaft 5 which transforms the reciprocal motion to rotary motion in the usual fashion. Also in the usual fashion, the crankshaft is connected to the wheels of the vehicle through a transmission and differential (not shown). Valve fulcrums 22 and 25 are used to provide engine valve control and may be those described in my U.S. Pat. No. 5,832,883 issued Nov. 10, 1998. Lines 21 and 26 connect fulcrums 22 and 25 to a hydraulic fulcrum regulator 34 through which a system controller 35 exercises engine valve control.

The inputs for controller 35 are an accelerator pedal 8 position sensor 7, Crankshaft position sensor 6, (engine speed sensor) and current engine system sensors (not shown). The outputs from controller 35 go to regulator 34 (through which the controller 35 exercises engine valve control), and fuel injector 13.

During vehicle operation, when accelerator pedal 8 is depressed or released, controller 35 calculates the power required by the new position and looks in its memory for the torque needed for that power in the engine map at the present engine speed. It then calculates the valve operations, fuel flow, and other engine variables, for a combination of cylinder firings at best BSFC which will meet limits of drivability, emission, engine temperature distribution, and smooth engine operation. As the engine speed changes in response to the change in power, controller 35 continues to calculate the torque needed to maintain the power called for by pedal 8 setting and calculates the necessary control values. When pedal 8 is fully released, controller 35 stops all fuel flow and disables all the active cylinders until pedal 8 is again depressed or until the engine speed falls to the idle speed. When idle speed is reached, controller 35 again calculates the control values to maintain idle speed in the manner stated previously.

FIG. 2 is a flow diagram illustrating the engine operations previously described. Step 1 (S1) decides if the accelerator pedal position has increased; if it has, actions 1 through 4 (A1–A4) are performed and control goes back to START; if it has not, step 2 (S2) is taken. S2 decides if the accelerator pedal position has decreased; if it has not, the control goes back to START; if it has, step 3 (S3) is taken. S3 decides if the accelerator pedal has been released; if it has not, actions 1 through 4 (A1–A4) are performed and control goes back to START; if it has, actions 5 and 6 (A5–A6) are performed and step 4 (S4) is taken. S4 decides if all cylinders are disabled; if they are not, actions 5 and 6 (A5–A6) are performed; if they are, the control goes back to START.

The following is an example of the calculations called for in the previous paragraph. A four cylinder engine is operating at 1250 revolutions per minute (rpm) with 50 foot-pounds (fp) of torque, which is a power level of 12 horsepower (hp). Pedal 8 is depressed an amount which calls for doubling the engine power. Controller 35 calculates the required torque at 1250 rpm to be 100 fp. The engine map stored in controller 35 shows the best BSFC at 1250 rpm is at a torque of 125 fp. The drivability limit, or time between power pulses (ppt), must not exceed 0.11 seconds (sec). At 1250 rpm there are 1250/60×2=41.7 power pulses per second (pp/s) with four cylinder, four cycle engine operation. The number of power pulses which may be missed is the integer of 0.11×41.7 (no fractional pulses) or 4 pulses. Therefore, there could be 1 power pulse for every fourth interval between pulses, and the maximum torque could be 4 times the required torque (4×100=400 fp). Since this is more than the best BSFC torque, controller 35 calls for all 4 cylinders to produce 125 fp of torque and then disables one of them every fifth firing, for a net torque of 100 fp. The ppt at the time of disablement would be 2×0.024=0.048 sec, well within the limit of 0.11 sec.

Note that when the selected cylinder was disabled with the early intake valve closing previously described, the BSFC of the active cylinders would be better than shown on the engine map because the energy to compress the disabled cylinder is not required. Although all the fixed friction losses of the engine would now have to be supplied from the 3 active cylinders, ¼ of the total engine friction loss is much lower than the compression energy for one cylinder with atmospheric pressure in the intake manifold. When additional cylinders are disabled, this advantage increases.

If the required torque had been 25 fp (instead of 100 fp), the maximum torque would only be 100 fp and this torque (with a higher BSFC) must be used. Controller 35 would then disable 3 cylinders to achieve the required torque. On a level road, this change would result in decrease in vehicle speed, and controller 35 would continue to make new torque calculations to match the power called for at pedal 8 setting.

Note that at 1250 rpm there are 41.7 power pulses per second, which means that the step change in engine power may be as small as 2.4%. At 2500 rpm (the speed for much of the CVS test), the change is 1.2%. The lack of success of previous engine disabling attempts in the prior art were due to the fact that 2 cylinders were disabled together. When 2 cylinders of a 6 cylinder engine are disabled, the step change in power is 33% and drivability problems arise.

In the present invention, because the step change in engine power is small, it is possible to supplement the calculations for engine timing to control more slowly changing effects such as emissions and uniform temperature distribution between cylinders. By dynamic analysis, engine vibration control may also be incorporated in those calculations.

While the description of the invention is a specific embodiment in a spark ignited engine, it is obvious that a diesel engine or hybrid engine or any other internal combustion engine would obtain many of the benefits of this invention. Therefore, the scope of this invention should be determined by the claims which follow.

Based on the forgoing description of the invention, what is claimed is:

1. A method for operating a vehicle internal combustion engine system which has a controller with a computer having a memory containing engine characteristics, and sensor means for receiving input signals from engine and vehicle components, and with output means to deliver signals to engine controls; at least two of said input signals being the position of an accelerator pedal and engine speed, and at least three of said output signals being those which control engine intake valves, exhaust valves, and fuel injectors; the method comprising steps of:

a) computing said engine torque requirement at said engine speed, b) looking up in said memory torques at said engine speed which have minimum brake specific fuel consumption, c) determining a cylinder disablement strategy versus time which will provide said torque requirement at said minimum brake specific fuel consumption, d) controlling said engine system by said method.

2. A method as defined in claim 1 wherein said cylinder disablement strategy enables and disables cylinders in a sequence which causes said minimum brake specific fuel consumption torques to average to said computed torque requirement in the shortest time.

3. A method as defined in claim 1 wherein said cylinder disablement strategy requires a time between power pulses which is greater than a drivability limit, the method comprising additional steps of:

e) looking up in said memory a torque having the lowest brake specific fuel consumption which will result in equal or less time between said power pulses than said drivability limit, f) determining said cylinder disablement strategy versus time which will provide said torque requirement using said lowest brake specific fuel consumption torque.

4. A method as defined in claim 1 wherein said cylinder disablement strategy is supplemented with strategies for engine dynamic balance.

5. A method as defined in claim 1 wherein said cylinder disablement strategy is supplemented with strategies for engine emission control.

6. A method as defined in claim 1 wherein said cylinder disablement strategy is supplemented with strategies for uniform temperature distribution among said engine cylinders.

7. A method for operating a multi-cylinder internal combustion engine as a variable displacement engine by disabling intake and exhaust valves of one or more cylinders in said engine, the method of disabling comprising the steps of:

a) disabling said exhaust valves immediately after said exhaust valves have closed at the end of their exhaust stroke, b) disabling said intake valves during their intake stroke in a manner so as to create a partial vacuum when the pistons of said cylinders reach bottom dead center, said vacuum being such as to provide a reversing pressure differential across the rings of said pistons which nets out to zero gas flow across said rings during the operation of said disabled cylinders.

* * * * *

UNITED STATES PATENT AND TRADEMARK OFFICE
CERTIFICATE OF CORRECTION

PATENT NO. : 5,975,052
DATED : Nov. 2, 1999
INVENTOR(S) : Moyer

It is certified that error appears in the above-identified patent and that said Letters Patent is hereby corrected as shown below:

In the Drawing, consisting of Fig. 1, should be deleted to be replaced with the Drawing Sheet, consisting of Figure 1. as shown on the attached page.

Signed and Sealed this

Sixth Day of June, 2000

*Attest:*

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,975,052
DATED : November 2, 1999
INVENTOR(S) : Moyer

It is certified that error appears in the above-identified patent and that said Letters Patent is hereby corrected as shown below:

<u>Drawings,</u>
The Drawing, consisting of Fig. 1, should be deleted to be replaced with the Drawing Sheet, consisting of Figure 1 as shown on the attached page.

Signed and Sealed this

Twenty-seventh Day of May, 2003

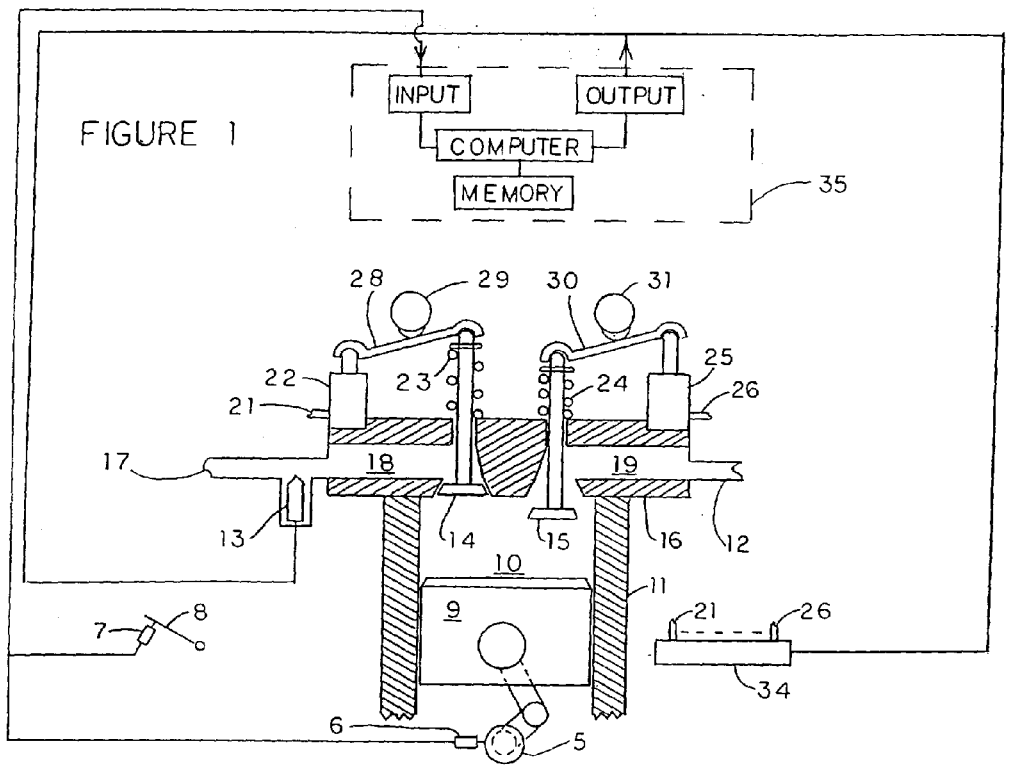

JAMES E. ROGAN
*Director of the United States Patent and Trademark Office*